(12) United States Patent
Schäfer et al.

(10) Patent No.: US 7,861,911 B2
(45) Date of Patent: Jan. 4, 2011

(54) ADJUSTABLE OVERLAP JOINT AND STRUCTURE PRODUCED THEREBY

(75) Inventors: Jean-Philippe Schäfer, Reipertwiller (FR); Jan Styrenius, Norrköping (SE); Sven Lundin, Finspång (SE)

(73) Assignee: Sapa Profiler AB, Vetlanda (SE)

( * ) Notice: Subject to any disclaimer, the term of this patent is extended or adjusted under 35 U.S.C. 154(b) by 249 days.

(21) Appl. No.: 11/715,388

(22) Filed: Mar. 8, 2007

(65) Prior Publication Data

US 2007/0215676 A1    Sep. 20, 2007

(30) Foreign Application Priority Data

Mar. 8, 2006    (SE) ..................... 0600522

(51) Int. Cl.
    *B23K 20/12*    (2006.01)
(52) U.S. Cl. .............. 228/112.1; 228/2.1; 428/598
(58) Field of Classification Search ......... 228/112.1, 228/2.1; 428/598
    See application file for complete search history.

(56) References Cited

U.S. PATENT DOCUMENTS

| | | | |
|---|---|---|---|
| 6,193,137 B1 * | 2/2001 | Ezumi et al. ............ | 228/112.1 |
| 6,722,286 B2 * | 4/2004 | Okamura et al. ......... | 105/396 |
| 6,933,057 B2 * | 8/2005 | Young et al. ............ | 428/593 |
| 7,073,701 B2 * | 7/2006 | Aota et al. .............. | 228/112.1 |
| 7,114,304 B2 * | 10/2006 | Aota et al. .............. | 52/588.1 |

FOREIGN PATENT DOCUMENTS

| EP | 0893190 A2 | 1/1999 |
|---|---|---|
| EP | 0947280 B1 | 10/1999 |
| EP | 1057574 A2 | 12/2000 |
| WO | WO-95/26254 B1 | 10/1995 |

* cited by examiner

*Primary Examiner*—Roy King
*Assistant Examiner*—Michael Aboagye
(74) *Attorney, Agent, or Firm*—Venable LLP; Eric J. Franklin

(57) ABSTRACT

A friction stir welding method and a structural body formed using a friction stir welding method. In particular, a friction stir welding method and a structural body made of an aluminium alloy extruded frame member formed by friction stir welding of a number of extruded frame members. Joining is performed by abutting a first member with a second member by contacting a downwards facing surface of an overlapping portion of a first member which projects above one face of the other member in the lateral direction in and an upwards facing surface of a second member in such manner that the downwards facing surface and the upwards facing surface are in slideable contact before joining and the first and second member are rotatable, and carrying out a friction stir welding to join the members to form a frame structure.

8 Claims, 2 Drawing Sheets

US 7,861,911 B2

ADJUSTABLE OVERLAP JOINT AND STRUCTURE PRODUCED THEREBY

FIELD OF THE INVENTION

The present invention relates to a friction stir welding method and a structural body which is formed using a friction stir welding method. In particular, the present invention is directed to a friction stir welding method and a structural body made of an aluminium alloy extruded frame member, such as is used for example in a railway vehicle, formed by friction stir welding of a number of extruded frame members.

The invention is directed to the provision of means for simplifying the welding of metal frame members, which may have a certain dimensional variation. The invention is particularly suitable for welding of multiple extruded members where the final frame has a slightly rounded contour.

BACKGROUND OF THE INVENTION

Friction stir welding is a method in which, by rotating a round pin (called "a rotary tool") which has been inserted into a welding joint between extruded frame members and moving the rotary tool along a welding line of the welding joint, the welding portion is heated, softened and plastically fluidized and is solidly welded. The rotary tool is comprised of a small diameter portion which is inserted into the welding joint and a large diameter portion which is positioned outside of the small diameter portion of the rotary tool. The small diameter portion and the large diameter portion of the rotary tool have the same axis. A boundary between the small diameter portion and the large diameter portion of the rotary tool is inserted to a small extent into the welding joint during welding.

The above-stated technique is disclosed, for example in WO95026254 (TWI).

Welding of large frame members maintaining close tolerances is known to be difficult due to the dimensional variations.

EP893190 discloses the use of sloped surfaces to compensate for dimensional variations causing a gap between the frames to be joined.

In EP0947280 an overlap joint is used to supply extra metal to the joint at friction stir welding of components having a gap at the joint area. There is no discussion of compensation for dimensional variations by adjustment of the frame structure.

EP1057574 discloses the use of an intermediate member overlapping the frame members to be joined at the joint area. No reason for the overlap is given, nor is the use of an integrated extension from one of the frame members considered.

SUMMARY OF THE INVENTION

An object of embodiments of the present invention is to provide a method for welding frame members by means of friction stir welding wherein dimensional variations of frame members to be joined are compensated for by a specific joint construction using an adjustable overlap. Another object of embodiments of the invention is to provide a frame construction with close to nominal tolerance while maintaining high production capacity, short cycle times and high repeatability.

The above-stated object may be achieved by the use of an overlapping portion of a first frame member which projects in the width direction from of the first frame member towards the other member overlapping an upwards facing surface of a second member in such manner that the overlapping portion and the upwards facing surface of the second frame member is in slideable contact before joining so that deviations from nominal dimensions can be compensated for by rotating the members.

The invention provides a method for welding. The invention also provides a frame construction.

DESCRIPTION OF EMBODIMENTS OF THE INVENTION

One embodiment of a friction stir welding method according to the present invention will be explained with reference to FIG. 2.

Figure 1:
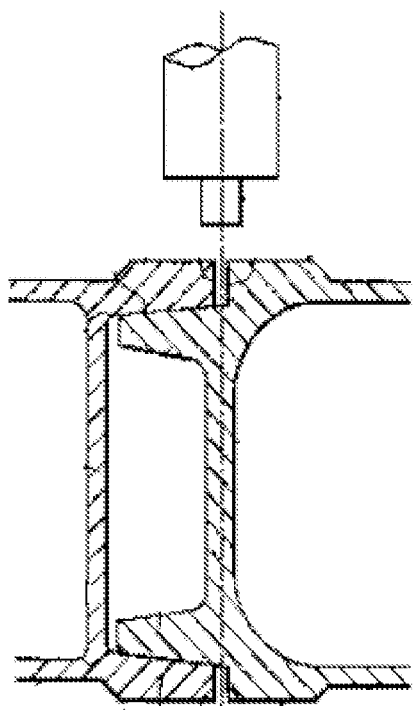
FIG. 1 is a longitudinal cross-sectional view showing friction stir welding of frame members according to the prior art.
Figure 2:
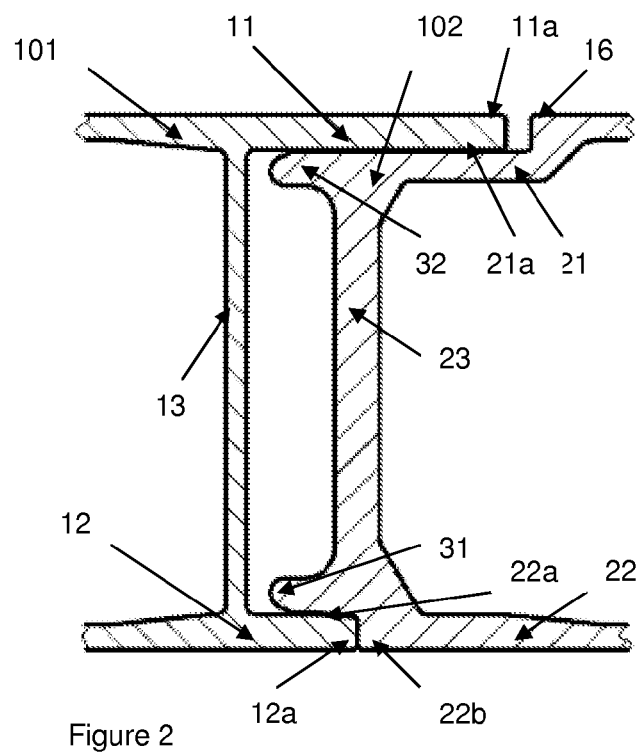
FIG. 2 is a longitudinal cross-sectional view showing frames to be joined using an adjustable overlap joint according to an embodiment of the present invention.
Figure 3:
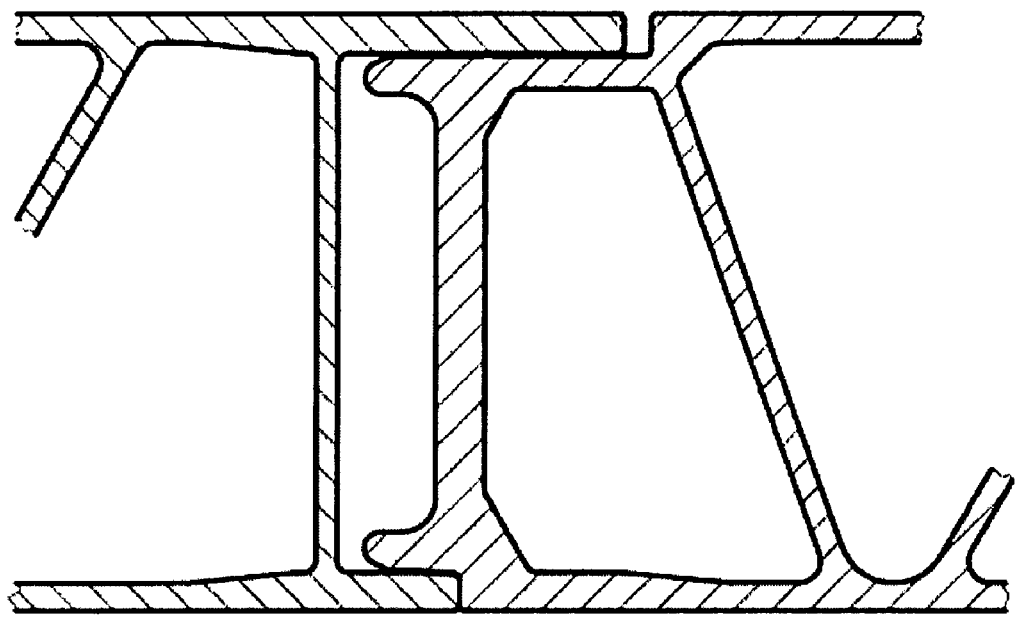
FIG. 3 is a longitudinal cross-sectional view showing a second embodiment of frames to be joined using an adjustable overlap joint according to an embodiment of the present invention.

FIG. 2 illustrates a cross section of a first frame member 101 and a second frame member 102, which are subjected to be welded together by means of friction stir welding. Both frame members are preferably made from extruded hollow frame members made of an aluminium alloy.

As can be seen from the figure, the first frame member includes a first flange 11 and a second flange 12 extending in parallel from a body (not shown in its entirety in the figure) of the frame member. The flanges 11 and 12 project towards the adjacent frame member 102.

Figure 4:
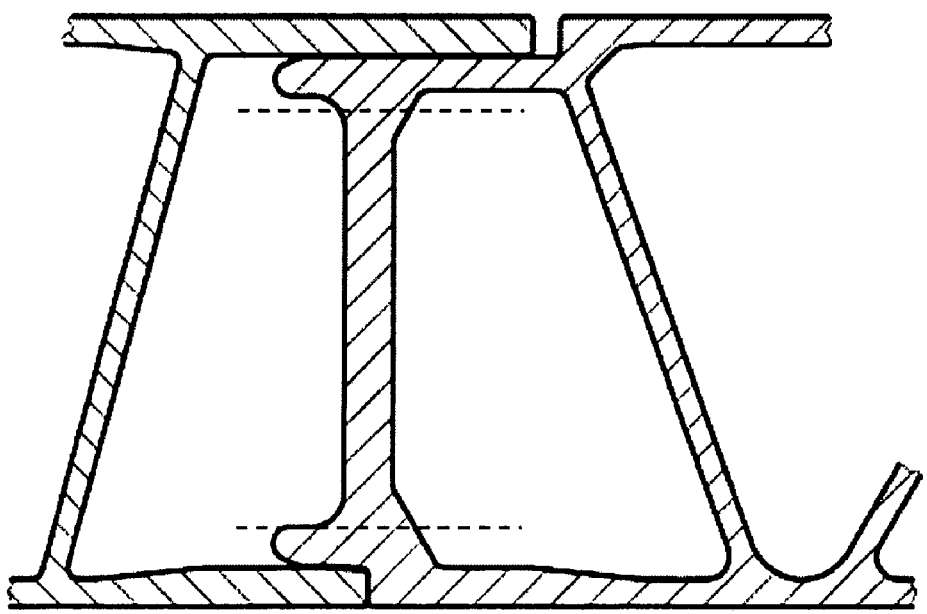
FIG. 4 is a longitudinal cross-sectional view showing a third embodiment of frames to be joined using an adjustable overlap joint according to an embodiment of the present invention.

The second frame member 102 includes a first wall 21 and a second wall 22 joined along a first edge of the first wall 21 and along a first edge of the second wall 22 by an intermediate wall 23. The intermediate wall (23) is preferably part of the second frame member. This intermediate wall is used as a root support during the friction stir welding. Alternatively the intermediate wall may be omitted (limitation of the frame at the dotted lines in FIG. 4) and a bobbin tool used to join the frames, providing a joint from two sides of each wall. A separate support may alternatively be inserted into the frame during welding to provide the required backing.

The frame members may have a slightly rounded shape depending on the final shape of the frame construction.

A first rebate is arranged along the first edge of the first wall 21. Said first rebate has along its length a first sunk surface 21a facing outwards. The first rebate has further a stepped wall 16, so that a step downwards is formed from the face of the first wall 21 to the first surface 21a. In correspondence to this, a second rebate is arranged along the first edge of the second wall 22. Said second rebate has along its length a second sunk surface 22a facing outwards. The second rebate has a stop wall 22b, so that a step downwards from the face of the second wall 22 to the second sunk surface 22a is formed. The first and the second sunk surfaces are substantially parallel to each other.

The distance between the inner surface of the first flange 11 facing the inner surface of the second flange 12 of the first frame member is approximately the same as the distance between the first and the second sunk surfaces of the first wall 21 and the second wall 22, respectively. Hence, the first frame member 101 will smoothly fit and be received by the second frame member 102, in that the flanges 11 and 12 will slide onto the sunk surfaces 21a and 22a when the first and the second members are brought together and joined.

According to one aspect of the invention the first flange 11 is arranged to be wider than the second flange 12. This means that the first flange 11 extends farther from the body of the first frame member than the second flange 12 (related to the lengths, that can be understood from the cross sectional view of FIG. 2). Accordingly, the first flange 11 will then have a greater overlap than the second flange 12 of the joint between the first member 101 and the second member 102 when they are brought together and fitted to each other, providing the construction with a great flexibility in terms of modification of the shape.

The welding process starts with joining the first frame member 101 to the second frame member, an action that starts with introducing the second flange 12 of the first frame member 101 into the second rebate of the second frame member 102 until an edge 12a of the second flange 12 abuts the end wall 22b of the second rebate. This step is followed by rotating the first frame member 101 about a contact point, working as a hinge, between said edge 12a of the second flange 12 and said end wall 22b making the inward directed surface of the first flange 11 slide across the first sunk surface 21a along the first rebate of the second frame member 102. The rotation is continued until the dimension of the fitted frames fit the nominal dimension of the product produced. The arrangement is such that the edge 11a of the first flange 11 will not reach the stepped wall 16 of the first rebate of the second frame member, when the first frame member and the second frame member are fully engaged with each other as described. Accordingly a gap will be formed between the edge 11a and the stepped wall 16. If needed the gap may be filled and polished to obtain a smooth surface.

Another aspect of the invention is to be able to freely adjust the overlap for the first flange 11 in relation to the first sunk surface 21a. In this way it is possible to regulate the dimension of the frame by sliding the flange 11 of the first frame member and the wall 21 of the second frame member in relation to each other before performing the welding.

The first flange (11) is arranged to be wider than the second flange (12), to allow for the adjustment of the angle between the frame members.

In the case of the railway car, the side constructive body and the roof constructive body have acicular arc shape. The present invention can be adapted to the above structure by adjusting the overlap of the flange 11 of the first frame in relation to the second frame member so that close to nominal dimensions are obtained.

The method of manufacturing this structural body will be explained. The hollow frame members 101 and 102 are mounted on a welding bed. Next, the frame members 101 and 102 are moved until the edge 12a and the end wall 22b are abutted. Next, the first and second frame members are slightly rotated around the lower attachment node (abutment surfaces of edge 12a and end wall 22b) to obtain a frame structure of nearly nominal dimension. The hollow frame members 101 and 102 are then fixed on the bed.

With this condition, a rotary tool of the friction stir welding apparatus is inserted from above to form a joint above the intermediate wall 23 and into the overlapping portion and the tool is moved along a welding line, so that friction stir welding is carried out.

The rotary tool comprises a large diameter portion and a small diameter portion at a tip end of the large diameter portion. The tip end (the lower end) of the small diameter portion of tool is positioned so that the shoulder does not extend outside the overlap of flange 11 in relation to surface 21a in the lateral direction.

Alternatively, welding can be carried out simultaneously from the upper and the lower side of the frame construction or by the use of a bobbin tool.

Although the present invention has been described and illustrated with respect to various exemplary embodiments thereof, it should be understood by those skilled in the art the various changes, omissions and additions may be made therein and thereto, without departing from the spirit and scope of the present invention. Thus, the present invention should be construed to include all possible embodiments and equivalents thereof which fall within the scope of the appended claims.

According to the present invention, a frame structure of high accuracy can be obtained.

We claim:

1. A method for welding a first and a second frame member utilizing friction stir welding, wherein said first frame member includes a first flange and a second flange extending in parallel from the first frame member and wherein said second frame member includes a first wall and a second wall extending in parallel from an end portion of the second frame member, said first wall having along a first end portion of said second frame member a first rebate with a first sunk surface facing outwards and a stepped wall forming a step from said first wall to said first sunk surface and said second wall having at said end portion a second rebate with a second sunk surface facing outwards and a stop wall forming a step from said second wall to said second sunk surface, wherein said first and said second sunk surfaces are substantially parallel to each other, the method comprising:

arranging said first flange to extend further from first frame member than the second flange;

introducing the second flange of the first frame member into the second rebate of the second frame member until an edge of the second flange abuts said stop wall of the second rebate;

rotating the first frame member about a contact point working as a hinge between said edge of the second flange and said stop wall until an inward directed surface of the first flange slides along the first sunk surface of the first rebate of the second frame member so as to freely adjust an overlap of the first flange in relation to the first sunk surface of the second frame member, such that an edge of the first flange does not reach the stepped wall of the first rebate of the second frame member, wherein the first flange has a greater overlap of the first sunk surface of the second frame member than an overlap of the second flange of the second sunk surface in the arrangement; wherein a slidable contact between the first flange and the first sunk surface of the rotating frame members to compensate for dimensional deviations; and carrying out a friction stir welding between the first frame member and the second frame member to form a welded joint along the edge of the second flange.

2. The method according to claim 1, wherein the welding is carried out simultaneously from two sides of the frame.

3. The method according to claim 1, wherein the welding is carried out simultaneously from two sides of at least one of the wall/flange.

4. The method according to claim 3, wherein the welding is carried out by the use of a bobbin tool.

5. The method according to claim 1, wherein a tool having a pin and a shoulder is used, and the tool is positioned so that the shoulder does not extend outside overlap of flange in relation to surface in the lateral direction.

6. The method according to claim 1, wherein an intermediate wall is used as a backing for the tool during the welding process.

7. The method according to claim 1, wherein a separate support is inserted as a backing during welding.

8. A method of adjusting a shape of a frame construction, the method comprising:

arranging said first flange to extend further from first frame member than the second flange;

arranging a first frame member comprising a first flange and a second flange extending in parallel from the first frame member and a second frame member comprising a first wall and a second wall extending in parallel from an end portion of the second frame member, said first wall having along said end portion a first rebate with a first sunk surface facing outwards and a stepped wall forming a step from said first wall to said first sunk surface and said second wall having at said end portion a second rebate with a second sunk surface facing outwards and a stop wall forming a step from said second wall to said second sunk surface, such that the edge of the first flange does not reach the stepped wall of the first rebate of the second frame member, wherein the first flange has a greater overlap of the first sunk surface of the second frame member than an overlap of the second flange of the second sunk surface in the arrangement, wherein said first and said second sunk surfaces are substantially parallel to each other;

introducing the second flange of the first frame member into the second rebate of the second frame member until an edge of the second flange abuts said stop wall of the second rebate; and rotating the first frame member about a contact point working as a hinge between said edge of the second flange and said stop wall until an inward directed surface of the first flange slides along the first sunk surface of the first rebate of the second frame member so as to freely adjust an overlap of the first flange in relation to the first sunk surface of the second frame member to compensate for dimensional deviations; and carry out a friction stir welding between the first frame member and the second frame member to form a welded joint along the edge of the second flange.

* * * * *